United States Patent
Kim et al.

(10) Patent No.: US 11,381,915 B2
(45) Date of Patent: Jul. 5, 2022

(54) VEHICLE AND OPERATION METHOD THEREOF

(71) Applicant: LG ELECTRONICS INC., Seoul (KR)

(72) Inventors: Kihyun Kim, Seoul (KR); Kyuho Lee, Seoul (KR); Byounggi Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 49 days.

(21) Appl. No.: 17/054,963

(22) PCT Filed: Nov. 26, 2018

(86) PCT No.: PCT/KR2018/014620
§ 371 (c)(1),
(2) Date: Nov. 12, 2020

(87) PCT Pub. No.: WO2020/111284
PCT Pub. Date: Jun. 4, 2020

(65) Prior Publication Data
US 2021/0219056 A1 Jul. 15, 2021

(51) Int. Cl.
*H04R 3/12* (2006.01)
*H04S 7/00* (2006.01)
(Continued)

(52) U.S. Cl.
CPC ............... *H04R 3/12* (2013.01); *G06T 7/70* (2017.01); *G06V 20/59* (2022.01); *G10K 15/10* (2013.01);
(Continued)

(58) Field of Classification Search
CPC .......... H04R 3/12; H04R 1/025; H04R 1/403; H04R 2499/13; H04S 7/30; H04S 7/301; H04S 7/302
(Continued)

(56) References Cited

U.S. PATENT DOCUMENTS 6,845,162 B1 * 1/2005 Emborg ........... G10K 11/17883
381/71.4
7,933,421 B2 * 4/2011 Asada ..................... H04S 7/301
381/86
(Continued)

FOREIGN PATENT DOCUMENTS

JP 2011-148473 A 8/2011

OTHER PUBLICATIONS

International Search Report, issued in PCT/KR2018/014620, PCT/ISA/210, dated Aug. 26, 2019.

*Primary Examiner* — David L Ton
(74) *Attorney, Agent, or Firm* — Birch, Stewart, Kolasch & Birch, LLP

(57) ABSTRACT

A vehicle according to an embodiment of the present invention may comprise: a microphone; a plurality of speakers; a memory for storing a sound field table including corresponding relationship between filter set values, virtual sound items, and boarding items; and a processor for receiving a sound signal via the microphone, determining a first filter set value matched to characteristics of the received sound signal, by using the sound field table, and controlling outputs of the plurality of speakers so as to output sound according to the determined first set value.

15 Claims, 10 Drawing Sheets

(51) Int. Cl.
*H04R 1/02* (2006.01)
*H04R 1/40* (2006.01)
*G06T 7/70* (2017.01)
*G10K 15/10* (2006.01)
*G10L 25/51* (2013.01)
*G06V 20/59* (2022.01)

(52) U.S. Cl.
CPC .............. *G10L 25/51* (2013.01); *H04R 1/025* (2013.01); *H04R 1/403* (2013.01); *G06T 2207/30196* (2013.01); *G06T 2207/30268* (2013.01); *H04R 2201/401* (2013.01); *H04R 2499/13* (2013.01)

(58) Field of Classification Search
USPC ..................................................... 381/302, 86
See application file for complete search history.

(56) References Cited

U.S. PATENT DOCUMENTS

| | | | |
|---|---|---|---|
| 8,396,226 B2* | 3/2013 | KnicKrehm | E04B 1/994 381/97 |
| 9,591,420 B2 | 3/2017 | Christoph et al. | |
| 2003/0065513 A1* | 4/2003 | Kaminuma | H04R 3/12 704/266 |
| 2004/0240676 A1* | 12/2004 | Hashimoto | H04S 7/305 381/63 |
| 2005/0244012 A1* | 11/2005 | Asada | H04S 7/301 381/98 |
| 2007/0234879 A1* | 10/2007 | Kobayashi | G10K 15/02 84/600 |
| 2007/0263880 A1* | 11/2007 | Sawashi | H04S 7/302 381/86 |
| 2008/0192954 A1* | 8/2008 | Honji | G10K 15/04 381/86 |
| 2008/0232603 A1* | 9/2008 | Soulodre | H04S 7/305 381/63 |
| 2009/0169028 A1* | 7/2009 | Ise | H04S 7/301 381/71.4 |
| 2010/0027805 A1* | 2/2010 | Itou | G10K 11/17881 381/71.12 |
| 2010/0208900 A1 | 8/2010 | Amadu et al. | |
| 2013/0101137 A1* | 4/2013 | Pedersen | H04S 7/301 381/103 |
| 2014/0010380 A1* | 1/2014 | Usher | H03G 3/3005 381/58 |
| 2014/0348354 A1 | 11/2014 | Christoph et al. | |
| 2015/0237446 A1* | 8/2015 | Katayama | H04S 7/301 381/163 |
| 2016/0071508 A1 | 3/2016 | Wurm et al. | |
| 2016/0142852 A1* | 5/2016 | Christoph | H04S 7/303 381/302 |
| 2016/0174010 A1 | 6/2016 | Mohammad et al. | |
| 2016/0379618 A1* | 12/2016 | Torres | G10K 11/17817 381/71.7 |
| 2017/0330549 A1* | 11/2017 | Terashima | H04R 1/1083 |
| 2021/0380055 A1* | 12/2021 | Kim | B60R 16/037 |

* cited by examiner

FIG. 7

| Option | EDT-1 | RT30-1 | RT60-2 | EDT-2 | RT30-2 | RT60-2 | NUMBER OF PASSENGERS | PASSENGER SEAT POSITION | FILTER SET VALUE |
|---|---|---|---|---|---|---|---|---|---|
| B | condition 1 | condition 2 | condition 3 | condition 4 | condition 5 | condition 6 | 4 | Case 1 | 12 |
| B | condition 1 | condition 2 | condition 3 | condition 4 | condition 5 | condition 6 | 4 | Case 2 | 10 |
| B | condition 7 | condition 8 | condition 9 | condition 10 | condition 11 | condition 12 | 3 | Case 2 | 9 |

VEHICLE AND OPERATION METHOD THEREOF

CROSS REFERENCE TO RELATED APPLICATIONS

This application is the National Phase of PCT/KR2018/014620 filed on November 26, 2018, which is hereby expressly incorporated by reference into the present application.

TECHNICAL FIELD

The present disclosure relates to a vehicle and, more particularly, to a vehicle for establishing a personalized sound field.

BACKGROUND ART

With development of an audio video navigation (AVN) system provided in a vehicle, interest in in-vehicle sound, such as outputting of sound of a portable device such as mobile terminals, PMPs or MP3 players to a speaker through a wired/wireless connection unit such as Bluetooth or AUX is increasing.

As acoustic control, there are a sound field reproduction method, an active noise control method of reducing the volume of sound in a space using a plurality of active sound sources, a method of changing a spacing between sound sources arranged in a specific shape, a method of increasing sound power radiated at a specific angle by changing time delay between and sizes of sound sources, etc.

In particular, research into adjustment of sound output through an in-vehicle speaker according to an in-vehicle position (a boarding position of a passenger) is actively being conducted.

As a related art, U.S. Pat. No. 9,591,420 shows an example of implementing a personalized sound field through speakers inside a vehicle.

However, in U.S. Pat. No. 9,591,420, the personalized sound field is implemented without considering the number of passengers in the vehicle and the seat positions of the passengers.

That is, in U.S. Pat. No. 9,591,420, a consistent personalized sound field is provided without considering the boarding situation of the vehicle, thereby causing auditory complaints of the passengers.

INVENTION

Technical Problem

An object of the present disclosure is to provide an optimized sound field to passengers in consideration of the number of passengers and the seat positions of the passengers inside the vehicle.

Another object of the present disclosure is to provide an optimized sound field, by determining a boarding situation of a vehicle using a sound signal input to a microphone.

Another object of the present disclosure is to provide an optimized sound field to passengers, by more accurately grasping a boarding situation of a vehicle.

Technical Solution

According to a vehicle according to an embodiment of the present disclosure may acquire a filter set value matching characteristics of a sound signal input to a microphone and control output of sound of a plurality of speakers disposed in the vehicle according to the acquired filter set value.

According to a vehicle according to an embodiment of the present disclosure may compare first boarding information obtained based on a sound signal input to a microphone with second boarding information obtained through a camera and adjust a filter set value based on the second boarding information when the first boarding information and the second boarding information do not coincide.

Additional scope of applicability of the present disclosure will become apparent from the detailed description below. However, since various changes and modifications within the spirit and scope of the present invention can be clearly understood by those skilled in the art, it should be understood that the detailed description and specific embodiments, such as preferred embodiments of the present disclosure, are given by way of example only.

Effect of the Invention

According to an embodiment of the present disclosure, it is possible to provide an optimized sound field to passengers in consideration of the number of passengers and the seat positions of the passengers inside the vehicle.

According to an embodiment of the present disclosure, it is possible to provide an optimized sound field to passengers, by more accurately grasping a boarding situation of a vehicle.

DESCRIPTION OF DRAWINGS

FIG. 7 is a view illustrating the configuration of a sound field table according to an embodiment of the present disclosure.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" or "unit" may be used to refer to elements or components. Use of such a suffix herein is merely intended to facilitate description of the specification, and the suffix itself is not intended to have any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

While ordinal numbers including "first", "second", etc. may be used to describe various components, they are not intended to limit the components. These expressions may be used to distinguish one component from another component.

When it is said that a component is "coupled with/to" or "connected to" another component, it should be understood that the one component is connected to the other component directly or through any other component in between. On the other hand, when it is said that a component is "directly connected to" or "directly coupled to" another component, it should be understood that there is no other component between the components.

A singular representation may include a plural representation unless context clearly indicates otherwise. In the present disclosure, the term "have" or "include" signifies the presence of a specific feature, number, step, operation, component, or part, or their combinations, not excluding the presence or addition of one or more other features, numbers, steps, operations, components, or parts, or their combinations.

Figure 1:
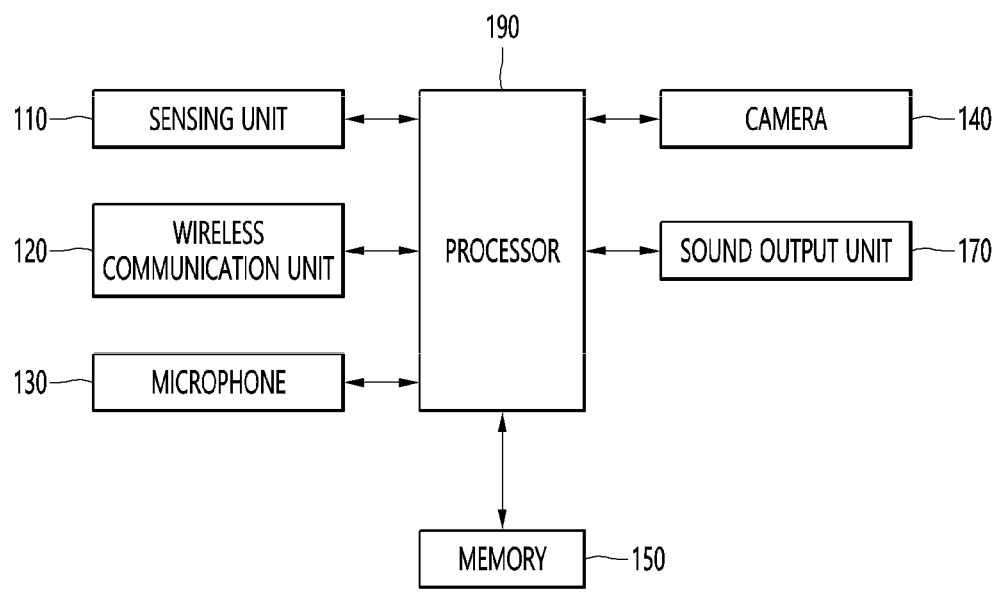
FIG. 1 is a block diagram illustrating the configuration of a vehicle according to an embodiment of the present disclosure.

FIG. 1 is a block diagram illustrating the configuration of a vehicle according to an embodiment of the present disclosure.

Referring to FIG. 1, the vehicle 100 may include a sensing unit 110, a wireless communication unit 120, a microphone 130, a camera 140, a memory 150, a sound output unit 170 and a processor 190.

The sensing unit 110 may sense status information of the vehicle.

The sensing unit 110 may include a pressure sensor.

Seats may be provided inside the vehicle 200. The measured value of the pressure sensor may be used to determine whether a passenger is seated in each seat.

The wireless communication unit 120 may include one or more modules for enabling wireless communication between the vehicle 100 and a wireless communication system, between the vehicle 100 and another vehicle 100 or between the vehicle 100 and an external server.

In addition, the wireless communication unit 120 may include one or more modules for connecting the vehicle 100 to one or more networks.

The microphone 130 may receive noise from the inside or outside of the vehicle.

A plurality of microphones 130 may be provided. The microphone 130 may be provided around the driver's seat of the vehicle.

The memory 150 may store a sound field table showing correspondence between a sound field mode, characteristics of a virtual sound signal, characteristics of a passenger signal, the number of passengers, the seat position of each passenger and a filter set value.

The sound field table may be generated by the vehicle 100 or may be received from an external server.

The sound output unit 170 may output an audio signal. The sound output unit 170 may output an audio signal generated in the vehicle or an audio signal received from an external device connected to the vehicle 100 by wire or wirelessly.

The sound output unit 170 may include one or more speakers. An example in which the sound output unit 170 includes a plurality of speakers will be described with reference to FIG. 2.

The processor 190 may control overall operation of the vehicle. The processor 190 may be implemented in the form of a chip.

The detailed function of the processor 190 will be described in detail below.

Figure 2:
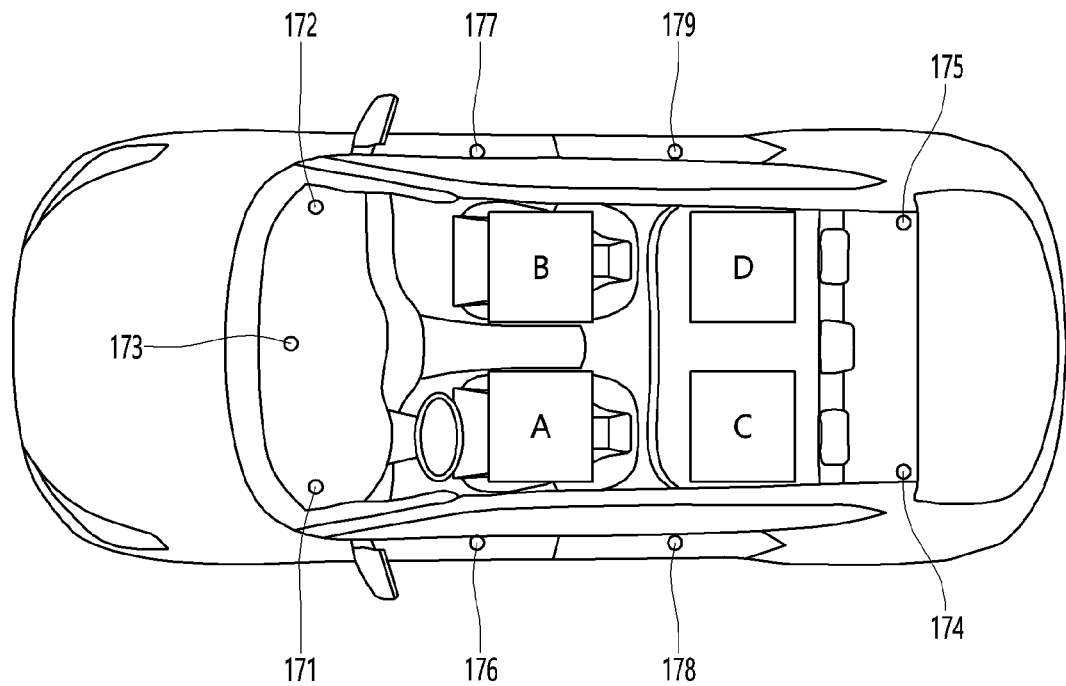
FIG. 2 is a view illustrating an example in which a plurality of speakers provided in a vehicle is arranged according to an embodiment of the present disclosure.

FIG. 2 is a view illustrating an example in which a plurality of speakers provided in a vehicle is arranged according to an embodiment of the present disclosure.

Referring to FIG. 2, the sound output unit 170 may include a plurality of speakers 171 to 179.

A first speaker 171 disposed in front of a driver's seat of the vehicle 100 and a second speaker 172 disposed in front of a passenger seat B may be tweeter speakers. The tweeter speaker is a small speaker for outputting high-register sound.

A third speaker 173 may be disposed between the front sides of the driver's seat A and the passenger seat B, a fourth speaker 174 may be disposed behind a first rear seat C, and a fifth speaker 175 may be disposed behind a second rear seat D.

The third speaker 173, the fourth speaker 174 and the fifth speaker 175 may be woofer speakers. The woofer speaker outputs low-register sound.

A sixth speaker 176 may be disposed on a door of the driver's seat A, a seventh speaker 177 may be disposed on a door of the passenger seat B, an eighth speaker 178 may be disposed on a door of the first rear seat C, and a ninth speaker 179 may be disposed on a door of the second rear seat D.

Figure 3:
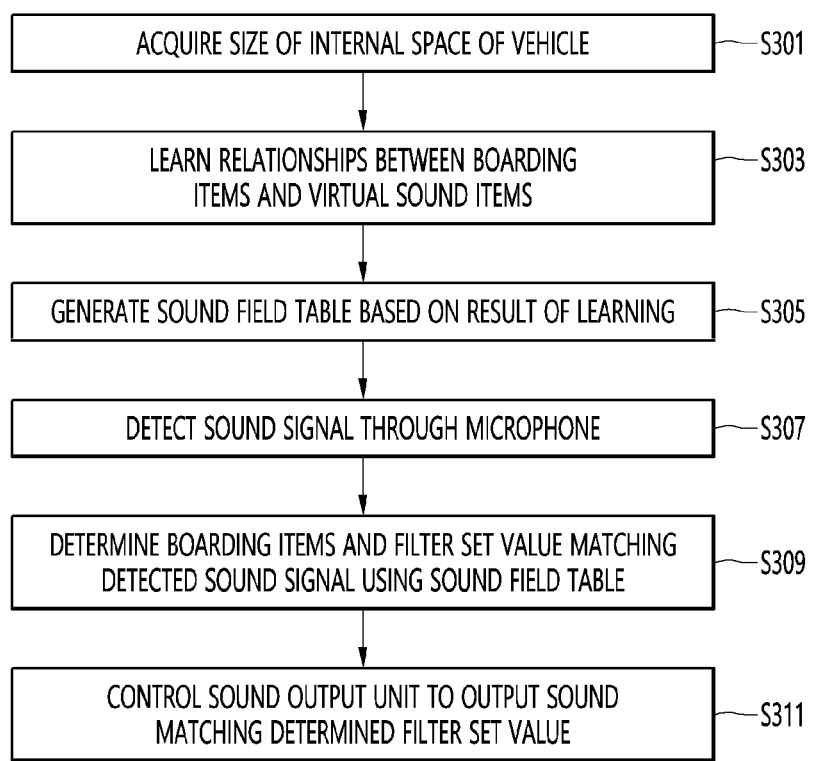
FIG. 3 is a flowchart illustrating a method of operating a vehicle according to an embodiment of the present disclosure.

FIG. 3 is a flowchart illustrating a method of operating a vehicle according to an embodiment of the present disclosure.

Referring to FIG. 3, the processor 190 acquires the size of an internal space of the vehicle (S301).

The processor 190 may reduce the internal space of the vehicle 100 using the specification information of the vehicle 100, thereby acquiring the reduced internal space of the vehicle.

The internal space of the vehicle may be expressed as a cabin having a rectangular shape.

The processor 190 may obtain the size of the internal space of the vehicle using a known simulation scheme. The size of the internal space of the vehicle may include the width and length of the cabin, when viewed from the top.

This will be described with reference to FIG. 4.

Figure 4:
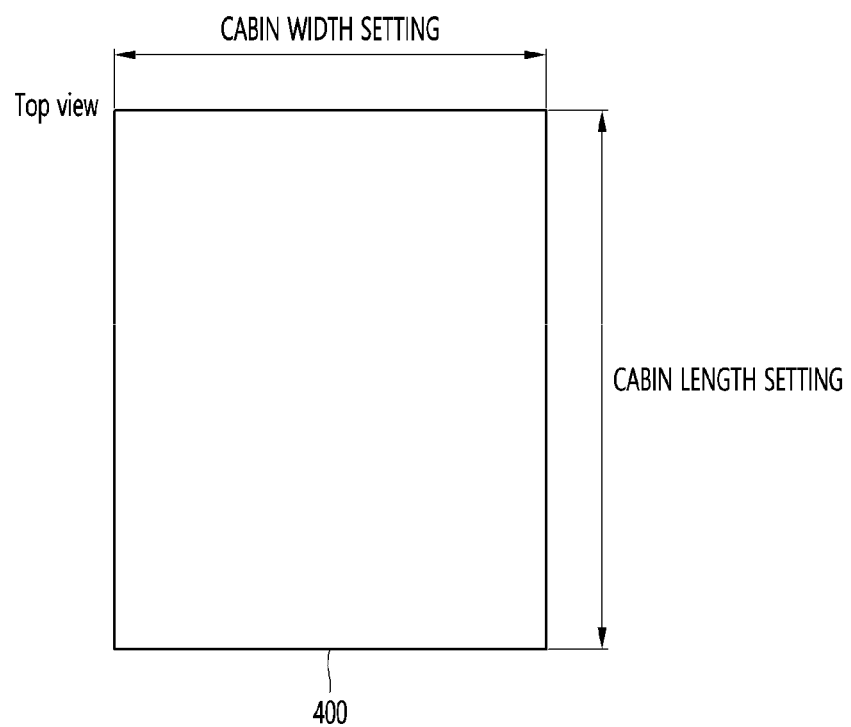
FIG. 4 is a view briefly showing an internal space of a vehicle as a cabin according to an embodiment of the present disclosure.

FIG. 4 is a view briefly showing an internal space of a vehicle as a cabin according to an embodiment of the present disclosure.

Referring to FIG. 4, the internal space of the cabin may be simplified to a cabin 400. The processor 190 may set the width and length of the cabin after acquiring the cabin 400.

Meanwhile, the processor 190 may set reflectivity of each corner (corresponding to the wall of the vehicle) configuring the cabin 400. Here, the reflectivity may be a ratio of a sound source reflected after hitting the boundary of the wall.

The reflectivity of the sound source may be referred to as an impedance boundary condition, and the reflectivity of each corner may be set through a known finite difference time domain (FDTD) simulation scheme.

FIG. 3 will be described again.

The processor 190 learns a correspondence relationship between boarding items and virtual sound items based on the size of the internal space of the vehicle (S303).

The boarding items may include the number of passengers, the position of a boarding seat, the length of a legroom of each seat, and the angle of the back of each seat.

The virtual sound items may include characteristics of a first virtual sound signal input when a reference signal output from a speaker is reflected and input to the microphone 130, and characteristics of a second virtual sound signal obtained by removing the first virtual sound signal from the reference signal.

The characteristics of the first and second virtual sound signals may include a first early decay time (EDT), a first reverberation time (RT30) and a second reverberation time (RT60).

The early decay time may be a time when the magnitude of a virtual sound signal decreases from 0 dB to −10 dB.

The first reverberation time may be a time when the magnitude of the virtual sound signal decreases from −5 dB to −35 dB.

The second reverberation time may be a time when the magnitude of the virtual sound signal decreases from −5 dB to −65 dB.

The processor 190 may collect virtual sound items corresponding to the changed boarding items while changing the boarding items.

A process of learning a relationship between the boarding items and the virtual sound items will be described.

Figure 5:
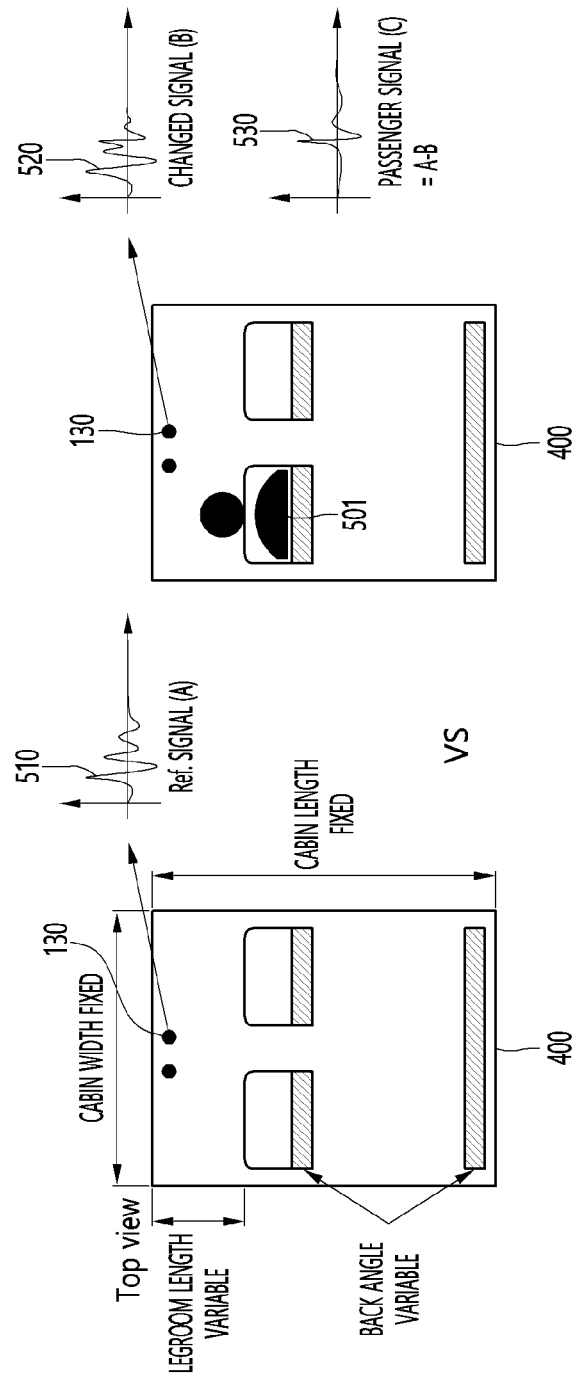
FIGS. 5 and 6 are views illustrating a process of acquiring learning variables necessary to learn a relationship between boarding items and virtual sound items according to an embodiment of the present disclosure.
Figure 6:
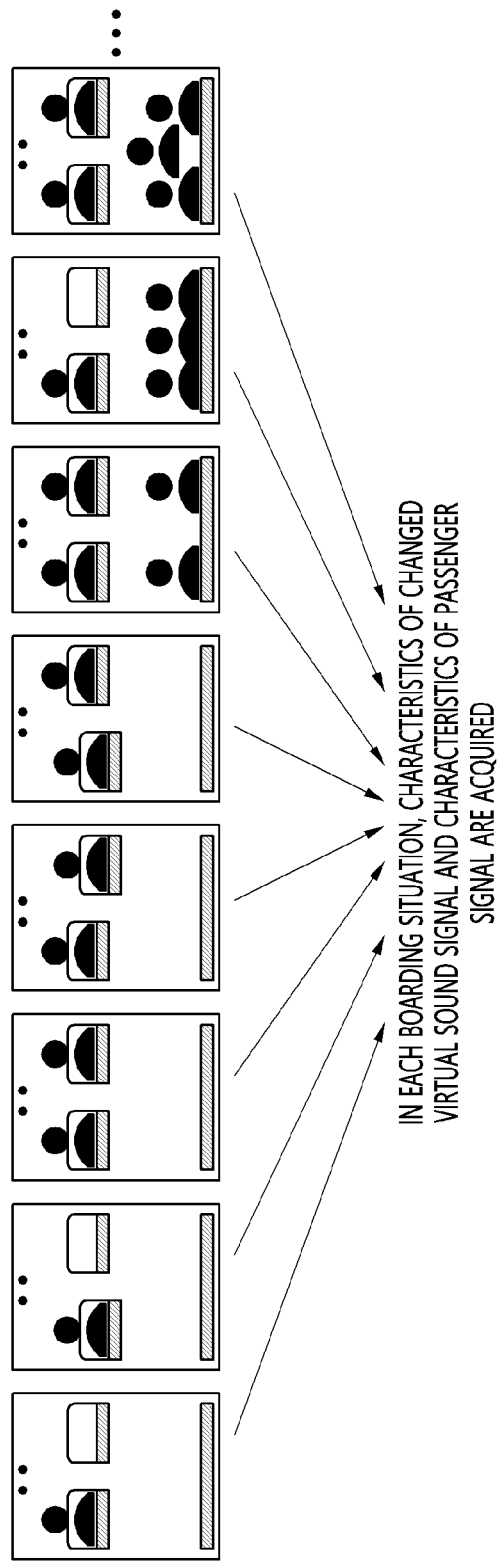

FIGS. 5 and 6 are views illustrating a process of acquiring learning variables necessary to learn a relationship between boarding items and virtual sound items according to an embodiment of the present disclosure.

Learning variables may be the boarding items and the characteristics of the first and second virtual sound signals.

Referring to FIG. 5, the boarding items may include the length of a legroom for each of the plurality of seats and the angle of the back of each of the plurality of seats.

It is assumed that a signal input to the microphone 130 when there is no passenger in the cabin 400 and the length of a legroom and the angle of the back of the seat are set to default values is a reference signal 510.

The reference signal 510 may be expressed as an impulse response.

If it is assumed that a passenger 501 is seated on the driver's seat of the cabin 400, a first virtual sound signal 520 input to the microphone 130 may be changed from the reference signal 510.

The processor 190 may extract the characteristics of the first virtual sound signal 520. The characteristics of the first virtual sound signal 520 may include an early decay time, a first reverberation time and a second reverberation time.

The second virtual sound signal 530 may be a signal obtained by removing the first virtual sound signal from the reference signal 510.

The processor 190 may extract the early decay time, the first reverberation time and the second reverberation time, which are the characteristics of the second virtual sound signal 530.

Referring to FIG. 6, an example of various boarding situations is shown.

The processor 190 may extract the characteristics of the virtual sound signal changed from the reference signal 510 and the characteristics of a passenger signal obtained by removing the changed virtual sound signal from the reference signal, with respect to each of the plurality of boarding situations.

The changed virtual sound signal may be the above-described second virtual sound signal.

The processor 190 may determine a correspondence relationship among the characteristics of the changed virtual sound signal, the characteristics of the passenger signal obtained by removing the changed virtual sound signal from the reference signal and the boarding situations thereto.

The boarding items may include one or more of the number of passengers, the positions of the seats of the passengers, the length of the legroom of each seat and the angle of the back of the seat.

The processor 190 may determine the correspondence relationship using a known classification algorithm.

The processor 190 may group the characteristics of the virtual sound signal and the characteristics of the passenger signal corresponding to the boarding situation.

Although a K-nearest neighbor algorithm may be used in such a grouping process, this is merely an example.

The processor 190 may generate a sound field table described below based on the determined correspondence relationship.

The sound field table may indicate the correspondence relationship among a boarding situation, the characteristics of the changed virtual sound signal and the characteristics of the passenger signal.

The sound field table may further include a filter setting value corresponding to the boarding situation. This will be described below.

FIG. 3 will be described again.

The processor 190 generates the sound field table based on a result of learning (S305).

The generated sound field table may be stored in the memory 150.

The processor 190 may generate the sound field table indicating the correspondence relationship among the boarding situation, the characteristics of the changed virtual sound signal and the passenger signals based on the result of learning.

The sound field table may be generated in an external server and transmitted to the vehicle 100.

The external server may learn the correspondence relationship between the boarding items and the virtual sound items, generate the sound field table based on the result of learning, and transmit the generated sound field table to the vehicle 100.

An example of the sound field table will be described with reference to FIG. 7.

FIG. 7 is a view illustrating the configuration of a sound field table according to an embodiment of the present disclosure.

Referring to FIG. 7, the sound field table 700 stored in the memory 150 is shown.

The sound field table 700 may include an option item 710, a first early decay time item 720, a first reverberation time item 730, a second reverberation time item 740, a second initial decay time item 750, a third reverberation time item 760, a fourth reverberation time item 770, a number-of-passengers item 780, a passenger seat position item 790 and a filter set value item 795.

The option item 710 is an item for selecting a sound field mode. For example, when the sound field mode is Mode A, sound in the same state is output to the front seats and the rear seats.

When the sound field mode is Mode B, the characteristics of sound output toward the front seats and the characteristics of sound output toward the rear seats may be independently differentiated. That is, when the sound field mode is Mode B independent sound may be output to each of the front seats and the rear seats.

The first early decay time item 720 may indicate the early decay time extracted from the first virtual sound signal, which is described in FIG. 5.

The first reverberation time item 730 and the second reverberation time item 740 may indicate the reverberation times extracted from the first virtual sound signal described in FIG. 5.

The second early decay time item 750 may indicate an early decay time extracted from the second virtual sound signal, which is described in FIG. 5.

The second virtual sound signal may be the same as the above-described passenger signal or changed virtual sound signal.

The third reverberation time item 760 and the fourth reverberation time item 770 may indicate the reverberation times extracted from the second virtual sound signal.

Each of the first early decay time item 720, the first reverberation time item 730, the second reverberation time item 740, the second initial decay time item 750, the third reverberation time item 760, and the fourth reverberation time item 770 may be expressed in a numerical range.

The numerical range may be identified as a specific condition, as shown in FIG. 7.

For example, condition 1 may have a range of 0.1 ms to 0.15 ms.

The number-of-passengers item 780 may indicate the number of persons who ride in the cabin.

The passenger seat position item 790 may indicate in which seats one or more passengers are located in the cabin.

For example, in CASE 1, four people are in the cabin, one people is in the driver's seat and three people are in the rear seats.

The filter set value item 795 may indicate a combination of setting values of filters respectively included in the plurality of speakers 171 to 179 described in FIG. 2.

The setting values of the filters may include one or more of the magnitude of the sound signal output from each of the plurality of filters and the frequency band of the sound signal.

The processor 190 may pre-set and include the filter set value according to the boarding situation including the number of passengers and the passenger seat position in the sound field table 700.

FIG. 3 will be described again.

The processor 190 detects the sound signal through the microphone 130 (S307), and determines the boarding items and the filter set matching the detected sound signal using the stored sound field table (S309).

The processor 190 may extract the characteristics of the sound signal input through the microphone 130 and the characteristics of the passenger signal obtained by removing the reference signal from the sound signal.

The processor 190 may determine the boarding items corresponding to the characteristics of the sound signal and the characteristics of the passenger signal, and acquire the filter set value corresponding to the determined boarding items from the sound field table.

The processor 190 controls operation of the sound output unit 170 to output sound matching the determined filter set value (S311).

The processor 190 may determine the filter set value according to the sound signal input to the microphone 130, and control operation of the plurality of speakers 171 to 179 to output sound using the determined filter set value.

An actual example of determining the filter set value based on the sound signal received according to the boarding situation will be described with reference to FIG. 8.

Figure 8:
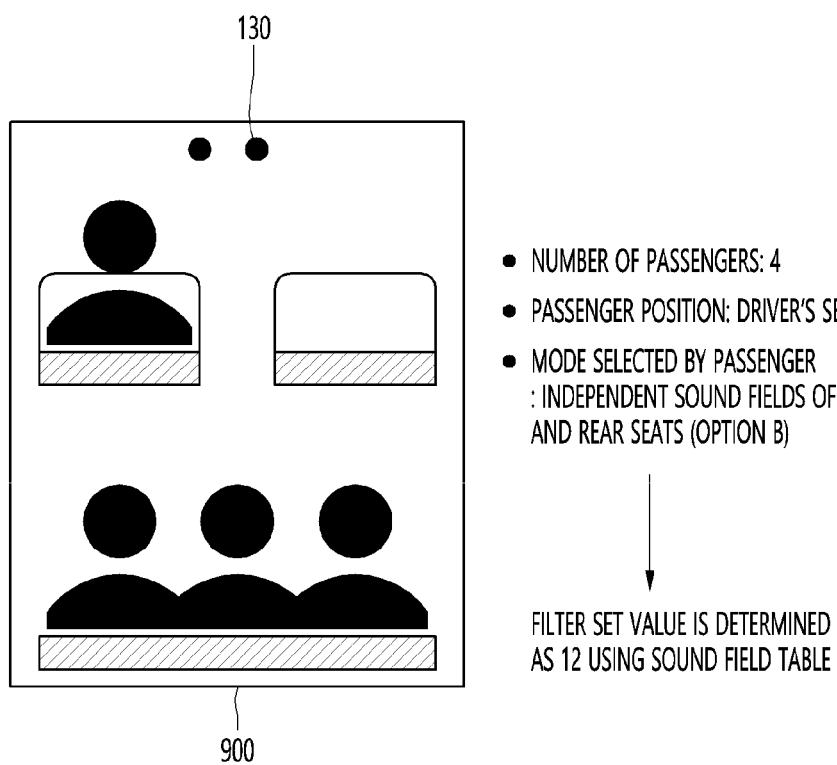
FIG. 8 is a view illustrating a configuration for determining a filter set value suitable for a detected boarding situation according to an embodiment of the present disclosure.

FIG. 8 is a view illustrating a configuration for determining a filter set value suitable for a detected boarding situation according to an embodiment of the present disclosure.

In FIG. 8, it is assumed that the sound field mode is set to Mode B in which independent sound is output to the front seats and the rear seats. The sound field mode may be set according to user's selection.

The processor 190 may receive the sound signal through the microphone 130.

The processor 190 may extract the early decay time and the first and second reverberation signals of the received sound signal.

Thereafter, the processor 190 may acquire a passenger signal obtained by removing the received sound signal from a prestored reference signal.

The processor 190 may extract the early decay time and the first and second reverberation signals of the acquired passenger signal.

The processor 190 may search for a boarding situation matching the early decay time and the first and second reverberation times of the extracted sound signal and the early decay time and the first and second reverberation times of the passenger signal, using the sound field table stored in the memory 150. Here, the boarding situation may include the number of passengers and the passenger seat position.

The processor 190 may determine the filter set value as 12 when the number of passengers is 4 and the passenger seat position corresponds to CASE 1.

That is, the processor 190 may determine the filter set value suitable for a current boarding situation through the sound signal input to the microphone 130, and control the plurality of speakers 171 to 179 to form sound fields using the determined filter set value.

Therefore, since a personalized sound field suitable for the boarding situation can be implemented, it is possible to improve user satisfaction.

Figure 9:
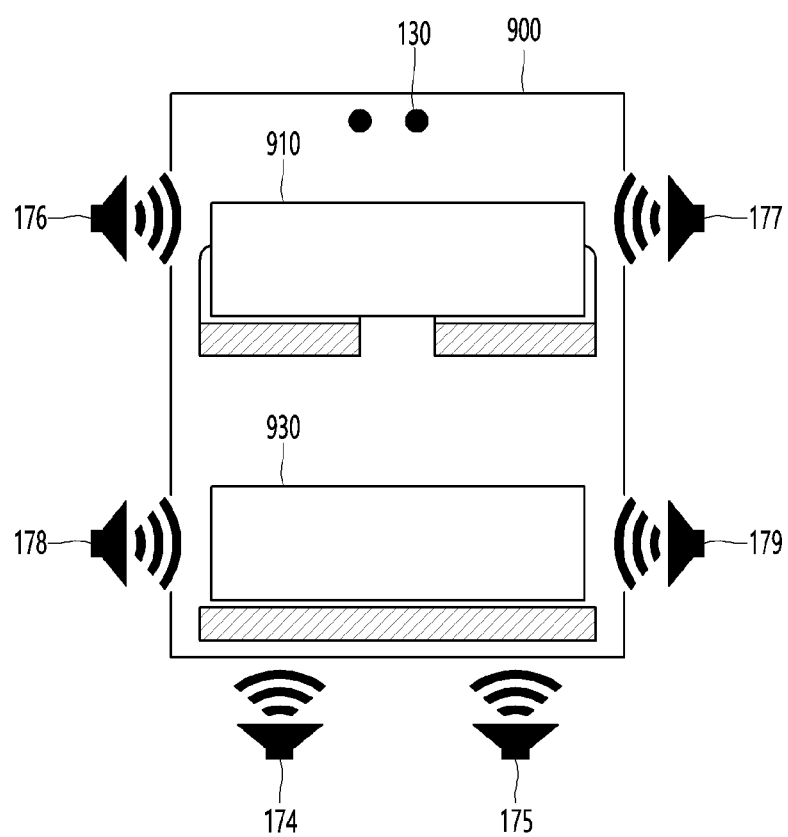
FIG. 9 is a view showing an example of implementing a sound field using only a sound field mode according to the related art.
Figure 10:
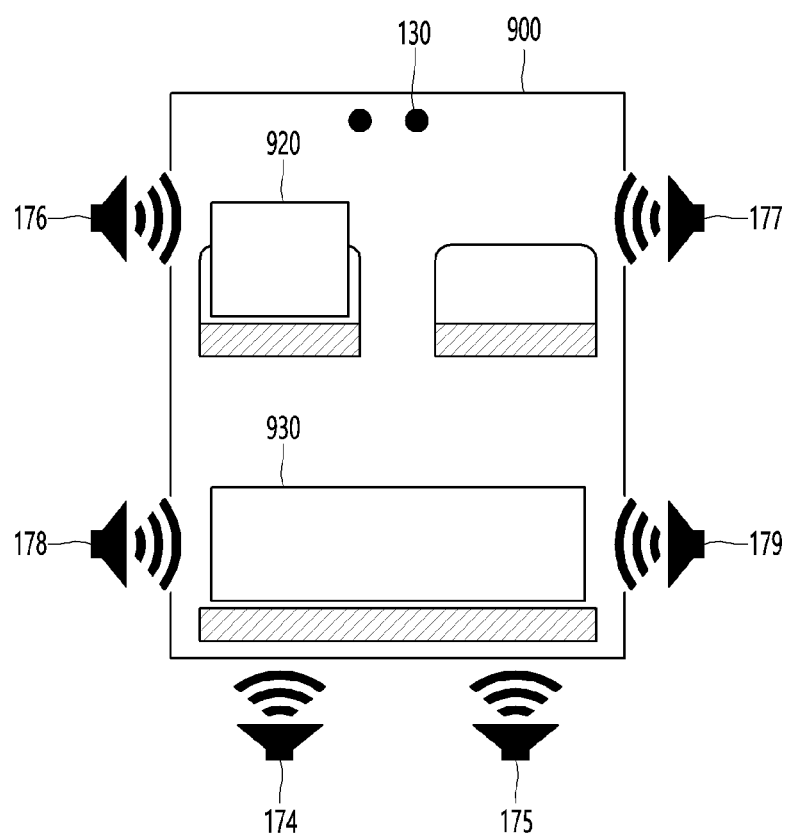
FIG. 10 is a view showing an example of implementing a sound field in consideration of a sound field mode and a boarding situation according to an embodiment of the present disclosure.

FIG. 9 is a view showing an example of implementing a sound field using only a sound field mode according to the related art, and FIG. 10 is a view showing an example of implementing a sound field in consideration of a sound field mode and a boarding situation according to an embodiment of the present disclosure.

In FIGS. 9 and 10, the boarding situation shown in FIG. 8 is assumed. That is, the boarding situation is a situation in which the number of passengers is 4, one people is in the driver's seat, and three people are in the rear seats.

In addition, in FIGS. 9 and 10, it is assumed that the sound field mode described in FIG. 7 is Mode B.

Referring to FIG. 9, in the related art, when Mode B is selected by a user as the sound field mode, the filter coefficients of the plurality of speakers 174 to 179 were set to implement a first sound field 910 and a second sound field 930.

In the first sound field 910, although a passenger is not in the passenger seat, since filter coefficients considering the passenger seat is applied, the passenger in the driver's seat cannot hear optimized sound.

Referring to FIG. 10, although the sound field mode is set to Mode B according to user selection, since the number of passengers and the seat position of the passenger are considered, the filter coefficients of the plurality of speakers 174 to 179 may be set such that an optimized third sound field 920 is provided to the driver.

Therefore, although the user sets only the sound field mode, optimized sound fields suitable for the boarding situation may be implemented. Accordingly, the passengers of the vehicle can experience personalized sound fields, thereby improving auditory satisfaction.

Figure 11:
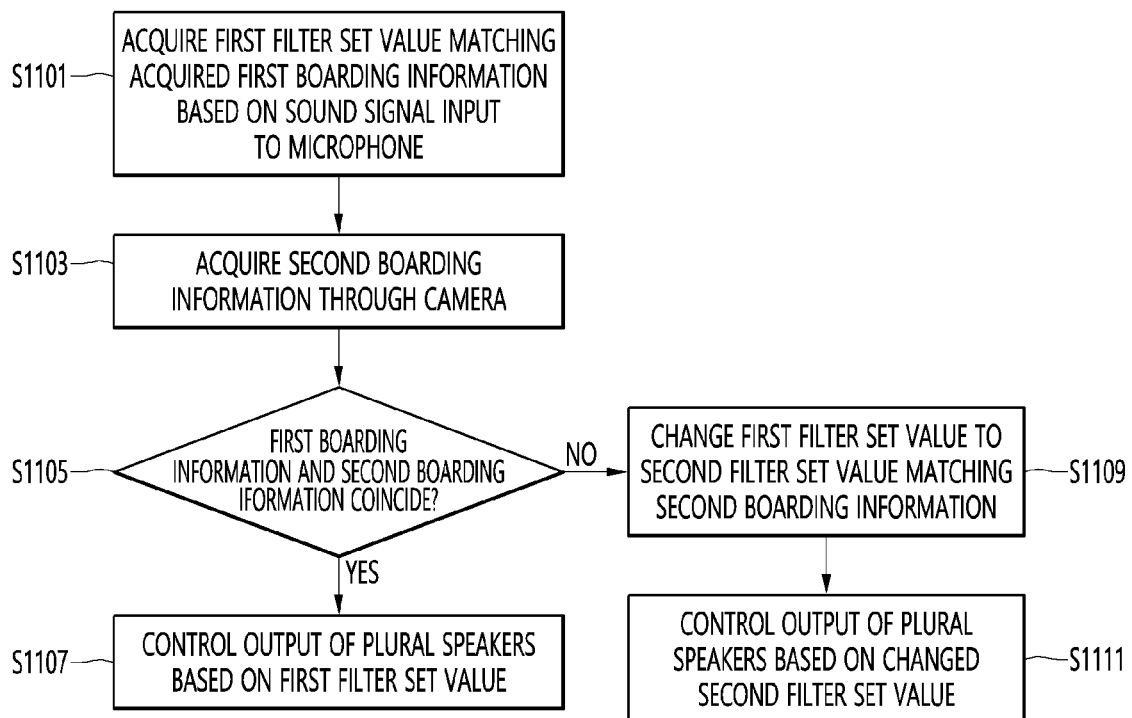
FIG. 11 is a flowchart illustrating a method of operating a vehicle according to another embodiment of the present disclosure.

FIG. 11 is a flowchart illustrating a method of operating a vehicle according to another embodiment of the present disclosure.

In particular, FIG. 11 shows an embodiment in which a first filter set value matching first boarding information is changed to a second filter set value matching second boarding information, when the first boarding information determined based on the sound signal input through the microphone 130 the second boarding information determined based on an image captured through the camera 140 do not coincide.

Referring to FIG. 11, the processor 190 acquires a first filter set value matching first boarding information acquired based on the sound signal input to the microphone 130 (S1101).

The process of acquiring the first filter set value matching the first boarding information may use the embodiment of FIG. 3.

The processor 190 acquires second boarding information through the camera 140 (S1103).

The processor 190 may determine the number of passengers and the seat position of the passenger using the image captured through the camera 140. To this end, as the camera 140, an RGB camera or an infrared (IR) camera may be used.

The processor 190 may recognize the faces of the passengers from the image captured through the camera 140 and determine the number of recognized faces as the number of passengers.

In addition, the processor 190 may determine in which area the face recognized in the captured image is located and determine the seat position of the passenger.

As a result, the processor 190 may acquire second boarding information including the number of passengers and the seat position of each passenger from the captured image.

The processor 190 determines whether the first boarding information and the second boarding information coincide (S1105).

When the first boarding information and the second boarding information coincide, the processor 190 controls the output of the plurality of speakers 171 to 179 based on the first filter set value (S1107).

When the first boarding information and the second boarding information coincide, the processor 190 may determine that the first boarding information is accurately recognized.

When the first boarding information and the second boarding information do not coincide, the processor 190 acquires a second filter set value matching the second boarding information and changes the first filter set value to the second filter set value (S1109).

When the first boarding information and the second boarding information do not coincide, the processor 190 may correct the filter set value based on the second boarding information.

This is because noise is included in the sound signal input to the microphone 130 and thus accurate boarding information cannot be extracted.

When the first boarding information and the second boarding information do not coincide, the processor 190 may acquire the second filter set value matching the second boarding information using the sound field table.

The processor 190 controls the output of the plurality of speakers 171 to 179 based on the changed second filter set value (S1111).

According to the embodiment of FIG. 11, since the boarding information of the vehicle can be more accurately grasped, it is possible to provide more optimized sound field to the passengers.

The present disclosure described above can be implemented as computer-readable code on a medium on which a program is recorded. The computer-readable medium includes all types of recording devices that store data that can be read by a computer system. Examples of the computer-readable recording medium include HDDs (Hard Disk Drives), SSDs (Solid State Disks), SDDs (Silicon Disk Drives), ROMs, RAMs, CD-ROMs, magnetic tapes, floppy disks, optical data storage devices, etc. In addition, the computer may include the processor.

The above exemplary embodiments are therefore to be construed in all aspects as illustrative and not restrictive. The scope of the embodiments should be determined by the appended claims and their legal equivalents, not by the above description, and all changes coming within the meaning and equivalency range of the appended claims are intended to be embraced therein.

The invention claimed is:

1. A vehicle comprising:
   a microphone;
   a plurality of speakers;
   a memory configured to store a sound source table including correspondence relationships among boarding items, virtual sound items and filter set values; and
   a processor configured to receive a sound signal through the microphone, determine a first filter set value matching characteristics of the received sound signal using the sound source table, and control output of the plurality of speakers to output sound according to the determined first filter set value.

2. The vehicle of claim 1, wherein the processor is configured to:
   extract characteristics of the sound signal and characteristics of a passenger signal obtained by removing the sound signal from a reference signal,
   determine boarding items matching the characteristics of the sound signal and the characteristics of the passenger signal, and
   determine the first filter set value matching the determined boarding items using the sound field table.

3. The vehicle of claim 2, further comprising a camera, wherein the processor is configured to:
   acquire second boarding information including the number passengers and the seat position of each passenger from an image captured through the camera,
   compare first boarding information and second boarding information including boarding items matching the characteristics of the sound signal and the characteristics of the passenger signal, and
   determine a second filter set value matching the second boarding information using the sound field table, when the first boarding information and the second boarding information are different.

4. The vehicle of claim 3, wherein the processor is configured to change the first filter set value to the second filter set value using the sound field table, when the first boarding information and the second boarding information are different.

5. The vehicle of claim 4, wherein the processor is configured to control output of the plurality of speakers to output sound according to the changed second filter set value.

6. The vehicle of claim 1,
wherein the boarding items include the number of passengers and a seat position of each passenger, and
wherein the virtual sound signals include an early decay time, a first reverberation time and a second reverberation signal of each of a virtual sound signal and a passenger signal obtained by removing the virtual sound signal from a reference signal.

7. The vehicle of claim 1,
wherein the first filter set value indicates a combination of respective setting values of a plurality of filters respectively included in the plurality of speakers, and
wherein the setting value of each filter includes one or more of a magnitude of a sound signal and a frequency band of a sound signal.

8. A method of operating a vehicle, the method comprising:
receiving a sound signal through a microphone;
determining a first filter set value matching characteristics of the received sound signal using a sound source table including correspondence relationships among boarding items, virtual sound items and filter set values, the sound source table being stored in a memory; and
controlling output of a plurality of speakers to output sound according to the determined first filter set value.

9. The method of claim 8, wherein the determining of the first filter set value comprises:
extracting characteristics of the sound signal and characteristics of a passenger signal obtained by removing the sound signal from a reference signal,
determining boarding items matching the characteristics of the sound signal and the characteristics of the passenger signal, and
determining the first filter set value matching the determined boarding items using the sound field table.

10. The method of claim 9, further comprising:
acquiring second boarding information including the number passengers and the seat position of each passenger from an image captured through a camera,
comparing first boarding information and second boarding information including boarding items matching the characteristics of the sound signal and the characteristics of the passenger signal, and
determining a second filter set value matching the second boarding information using the sound field table, when the first boarding information and the second boarding information are different.

11. The method of claim 10, further comprising changing the first filter set value to the second filter set value using the sound field table, when the first boarding information and the second boarding information are different.

12. The method of claim 11, further comprising controlling output of the plurality of speakers to output sound according to the changed second filter set value.

13. The method of claim 8,
wherein the boarding items include the number of passengers and a seat position of each passenger, and
wherein the virtual sound signals include an early decay time, a first reverberation time and a second reverberation signal of each of a virtual sound signal and a passenger signal obtained by removing the virtual sound signal from a reference signal.

14. The method of claim 8,
wherein the first filter set value indicates a combination of respective setting values of a plurality of filters respectively included in the plurality of speakers, and
wherein the setting value of each filter includes one or more of a magnitude of a sound signal or a frequency band of a sound signal.

15. A non-transitory computer-readable recording medium having recorded thereon a program for performing a method of operating a vehicle, the method comprising: receiving a sound signal through a microphone; determining a first filter set value matching characteristics of the received sound signal using a sound source table including correspondence relationships among boarding items, virtual sound items and filter set values, the sound source table being stored in a memory; and
controlling output of a plurality of speakers to output sound according to the determined first filter set value.

* * * * *